J. PATTEN.
APPARATUS FOR WATER PURIFICATION.
APPLICATION FILED SEPT. 4, 1914.
1,121,394.
Patented Dec. 15, 1914.
2 SHEETS—SHEET 2.
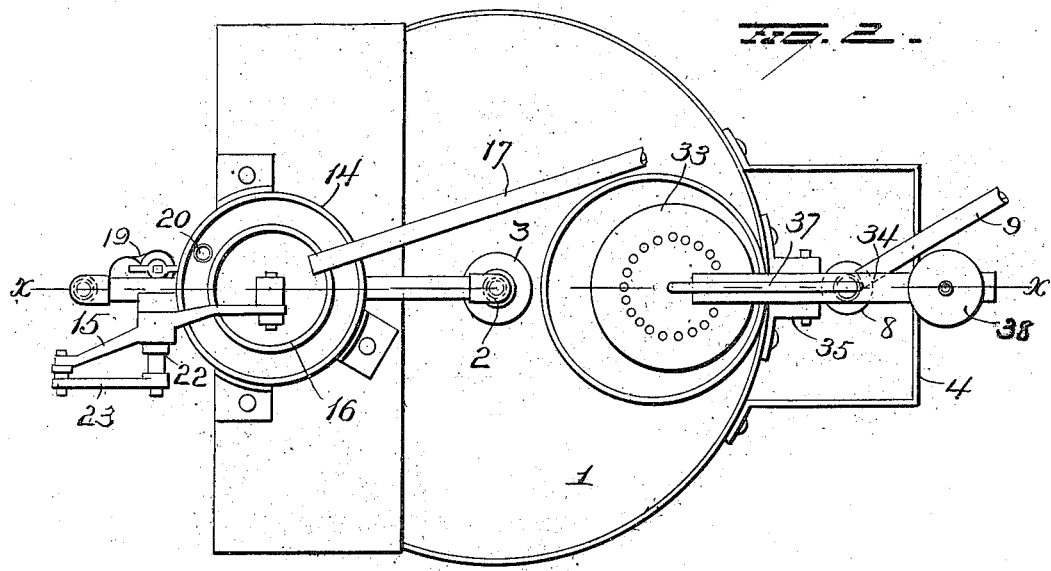
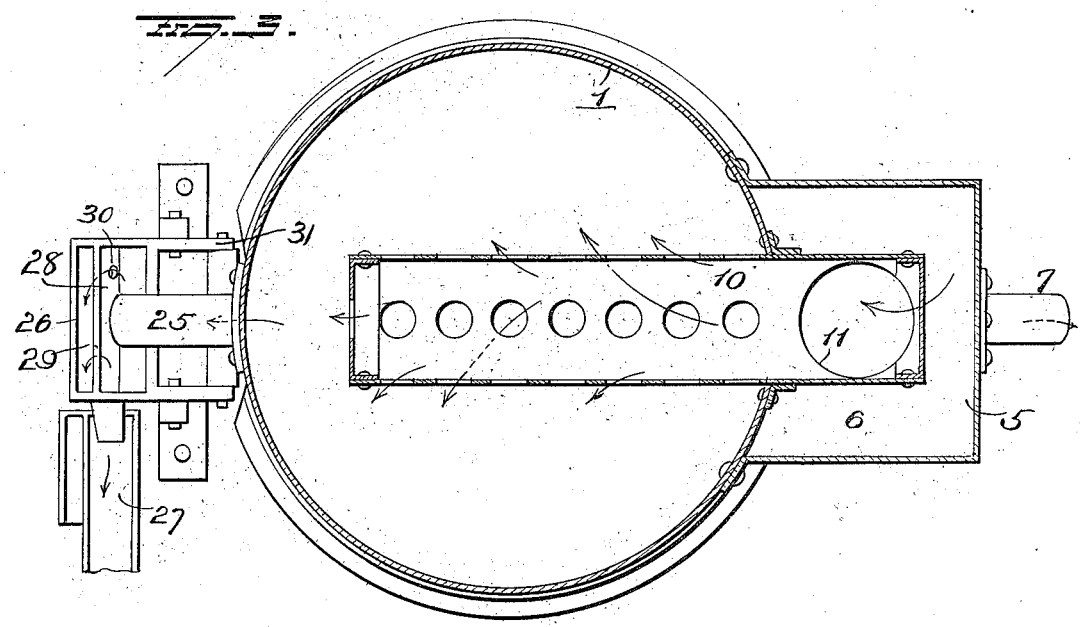
WITNESSES
E. J. Nottingham
S. J. Nottingham
INVENTOR
John Patten
By H. A. Seymour
Attorney

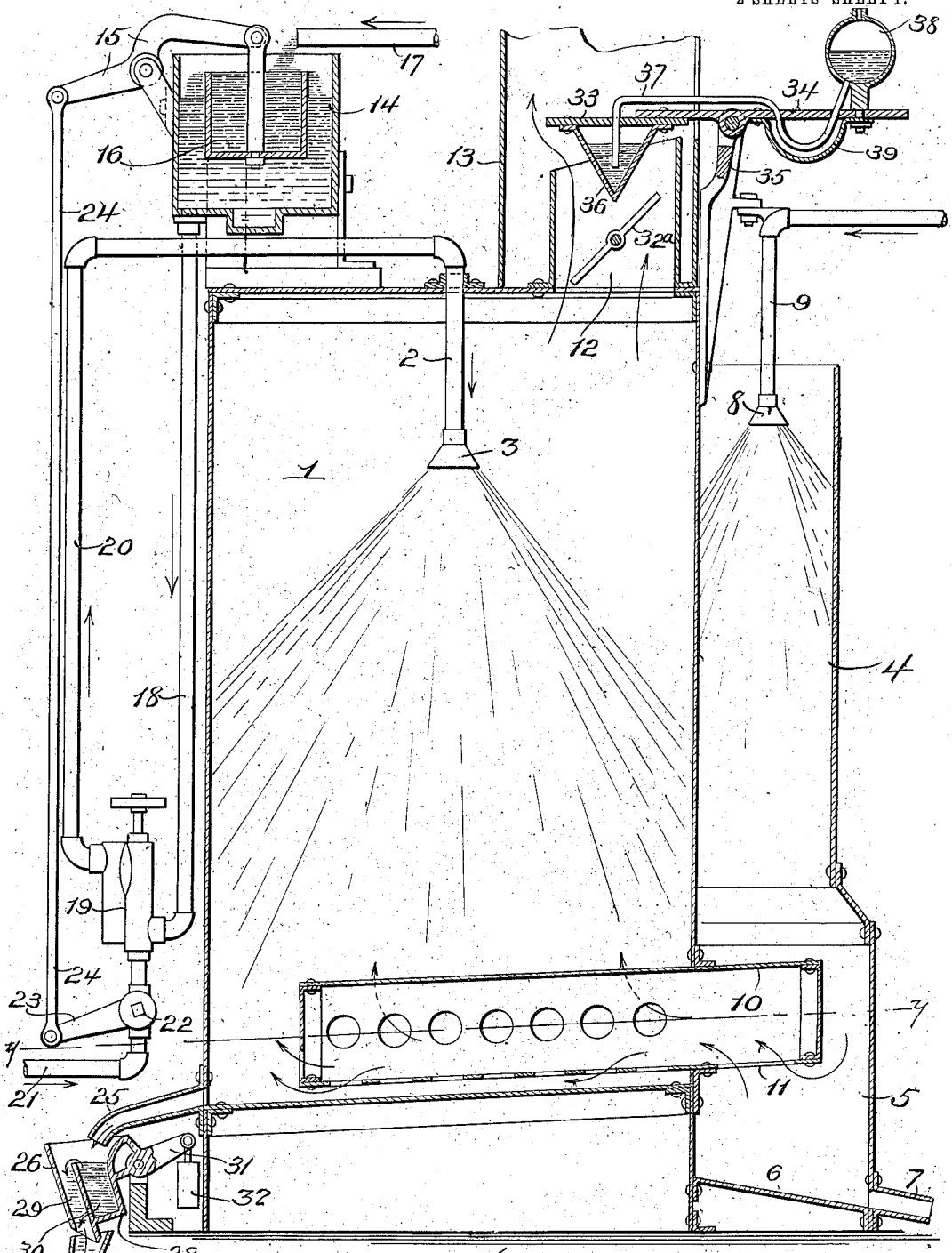

UNITED STATES PATENT OFFICE.

JOHN PATTEN, OF BALTIMORE, MARYLAND, ASSIGNOR OF ONE-HALF TO SAMUEL M. SHOEMAKER, OF ECCLESTON, MARYLAND.

APPARATUS FOR WATER PURIFICATION.

1,121,394.　　　　　　Specification of Letters Patent.　　Patented Dec. 15, 1914.

Application filed September 4, 1914. Serial No. 860,286.

*To all whom it may concern:*

Be it known that I, JOHN PATTEN, of Baltimore, in the State of Maryland, have invented certain new and useful Improvements in Apparatus for Water Purification; and I do hereby declare the following to be a full, clear, and exact description of the invention, such as will enable others skilled in the art to which it appertains to make and use the same.

This invention relates to improvements in apparatus for the purification of water, one object of the invention being to provide apparatus which will operate effectually to eliminate all organic matter as well as mineral compounds from the water and thus avoid the formation of an objectionable and offensive core in a block of ice when the water is used for ice making.

With this and other objects in view the invention consists in certain novel features of construction and combinations of parts as hereinafter set forth and pointed out in the claims.

In the accompanying drawings, Figure 1 is a vertical longitudinal section on the line $x$—$x$ of Fig. 2; Fig. 2 is a plan view; and Fig. 3 is a sectional view on the line $y$—$y$ of Fig. 1.

My improvements contemplate apparatus used for purifying distilled water for ice making, and comprises means for spraying or atomizing water while hot through a regulated quantity of air in such manner that the water, as it settles from the air, will still remain very hot, so that it will not retain any air or other gases in solution. This spraying is accomplished in a closed vessel provided with the necessary appliances for spraying the hot water and passing through the tank the required amount of air and avoiding the too rapid cooling of the water by the presence of too much air. This operation is conducted in such a manner that the gases and odors will leave the water and pass off with the air. The soluble metallic compounds are oxidized and rendered insoluble so that they can be filtered out, and I obtain a much superior quality of water by utilizing the heat of the water itself, and the air through which it is sprayed.

I have found that spraying cold water through air will not subserve the purpose of my invention, but that it is essential to the successful accomplishment of the purpose of my invention that the water shall be maintained hot and finely subdivided while it is being subjected to the air current. While the spraying of cold water through air might result in the removal of a portion of the material which would cause an odorous core in the ice, still it would absorb (even if it were previously pure) a sufficient amount of air and other gases to give a bad core to the ice.

In carrying out my invention, the water is preferably heated under pressure to a temperature considerably above the boiling point, so that when it is sprayed there will be a sufficient amount of steam generated from the heat within itself to divide or atomize the water into very fine particles. This aqueous mist will be of sufficiently high temperature to heat air to almost the boiling point so that the action of the free oxygen in the air will be very energetic in completing the decomposition of some of the partially decomposed matter and breaking it up into simpler and less objectionable compounds. The heat will also be sufficiently high to prevent the water from re-dissolving any of the gases that it may have given up and also to prevent it from absorbing air, which would later cause the formation of a white core in the ice.

In the apparatus shown in the drawings, 1 represents a tank, through the top of which, a pipe 2 enters and provided with a spraying nozzle 3. Adjacent to the tank 1 is a smaller tank or tube 4 having an open upper end and communicating at its lower end with a chamber 5 having an inclined bottom 6 and a discharge outlet 7. The air will freely enter the open upper end of the tank or tube 4 and as it passes downwardly through the same, will be subjected to a water spray which will serve to wash said air to free it from any dust or other solid particles which it might contain. The water spray in the auxiliary tank or tube 4, may be provided through the medium of a nozzle 8 at the end of a pipe 9 which enters the open end of said tank or tube, and said pipe may be supplied with water from any convenient source.

A perforated pipe 10 is disposed in proximity to the bottom of the tank 1 and projects into the air chamber 5, said pipe being provided (within the air chamber) with an air inlet opening 11, in its under portion, through which air passes (without carrying water with it) from the chamber 5 to the perforated pipe 10, by means of which latter the air will be discharged in the lower portion of the tank 1. In its passage upwardly through the heated aqueous mist in the tank 1, the air will be heated and will find an exit through a tube 12 to a suitable stack 13, such discharge of air being regulated as hereinafter described.

An open water receptacle 14 is mounted upon the tank 1 and supports a bell-crank lever 15 from one arm of which, a cup 16 is hung so as to be suspended within said receptacle. A pipe 17 from a condenser, conducts water (which usually has a temperature varying from two hundred to two hundred and twelve degrees Fah.) to the cup 16,—from which latter the hot water overflows into the receptacle 14. From the bottom of the receptacle 14, the hot water flows downwardly through a pipe 18 to a steam injector 19 and the latter operates to force the water upwardly through a pipe 20 which communicates with the pipe 2.

A pipe 21 supplies steam from any convenient source, to the injector 19, and in this pipe, a valve 22 is located. The stem of this valve is provided with an arm 23, with which the lower end of a rod 24 is connected, the upper end of said rod being connected with an arm of the bell-crank lever 15.

The cup 16 in the receptacle 14 acts as a float which, (when it rises) increases the supply of steam to the injector by imparting motion through the bell-crank 14, rod 24 and arm 23 to the valve 22, which will increase the opening movement of said valve. When the level of the water in the receptacle 14 descends, the cup 16 will descend and operate (through the connections above described) to operate the valve 22 in the reverse direction and thus throttle the steam to prevent the injector from exhausting the water supply. The steam injector will increase the pressure of the water to about one hundred pounds or more, to the square inch, in the pipe 20, and under such pressure the water will be discharged from the nozzle 3 and sprayed or atomized in the tank 1. The steam used for pumping the water also serves to heat it (or to maintain it hot) and it will be thrown from the nozzle in very fine particles at a temperature over the boiling point, which causes the small globules of water to divide up into very small particles, thereby exposing the water intimately to the action of the surrounding air and steam given off by the hot water,—under which conditions, the various gases and odors formerly held in solution by the water will, by the law of the diffusion of gases, leave the water and pass off with the air and water vapor formed, and those small particles will also be exposed to free oxygen of the atmosphere at a temperature a little below the boiling point. Under these conditions a great many of the compounds will be oxidized and rendered insoluble, and the gaseous products from this decomposition will pass off with the air, while the mineral substances, which are rendered insoluble, may be filtered out after the water has cooled and before it reaches the ice molds.

In order to guard against the contamination of the water in the tank 1 by reason of too great a drop of temperature of the atomized water, which might occur by an abnormal reduction of the water supply, the appliances now to be explained may be employed.

Purified water is discharged from the tank 1 through a spout 25, into a by-pass device 26, which latter discharges into a suitable pipe or duct 27. The by-pass device comprises a receptacle 28 provided with a passage 29 into which water may overflow from the main portion of the receptacle, and the latter is provided at or near its bottom with a small hole 30 which communicates with the passage 29. The outer wall of the passage 29 projects somewhat above the main portion of the receptacle. The receptacle 26 is carried by a pivotally supported arm 31, from the free end of which, a weight 32 is suspended to counterbalance the said receptacle and its contents. During the normal operation of the apparatus, the by-pass device will be disposed as shown in Fig. 1, so that the water will flow from the receptacle and be discharged through the passage 29 into the receiving pipe or duct 27.

Should an accident happen to the supply of water or steam, or anything go wrong with the injector, the consequent reduction of the supply of water would cause the temperature to drop to a point where the water would carry with it a sufficient amount of air and gases to form an objectionable core in the ice when the water has been frozen. To prevent this from contaminating the water previously treated, the drip hole 30 is made so small that it will not conduct all the water while the apparatus is working at normal capacity, and therefore part of it will overflow into the upper portion of the passage 29, but when the supply of water diminishes to the extent that the water will not have the desired qualities, the drip hole 30 will drain the receptacle 28, and the weight 32 will descend and elevate said receptacle 28 so as to cause the water to be discharged through the passage 29 without entering the pipe or duct 27.

The flow of air through the tank 1 may be regulated by a manually operable valve $32^a$ in the tube 12, if the supply of water to the tank be comparatively constant, said valve being set at the proper position after the temperature within the tank has been determined. However, where there is an irregularity of flow, which might cause the temperature within the tank 1 to fluctuate, the regulation of the air should be automatic. For this purpose, I have provided an automatic heat regulator comprising a valve 33 adapted to coöperate with the upper end of the damper pipe or tube 12, said valve being carried by an arm or lever 34 pivotally supported by a bracket 35. A bulb 36 (preferably of copper) depends from the valve 33 and is connected by a tube 37 with a bulb 38 mounted on the free end of the valve arm or lever 34, said tube passing through a cooling chamber 39 carried by said arm or lever. A sufficient amount of tetrachlorid of carbon is placed in said bulbs to fill one of them to about three-fourths its capacity. When the heat regulator is in its normal working condition as shown in the drawings, about one-half of the liquid will be in each bulb, and the valve will be balanced. Should the temperature in the tank 1 fall below 155° F. the liquid will run from the bulb 38 into the bulb 33 and the valve will descend, thus throttling the air and thereby allowing the hot water to increase the temperature. On the other hand, if the temperature in the tank 1 should rise too high,—above 160° F. for instance,—tetrachlorid vapors will be formed in the bulb 36 and drive the liquid through the tube 37 into the bulb 38, the increased weight in the latter causing it to descend and the valve 33 to rise,—thereby increasing the flow of air through the tank and producing the desired reduction of temperature.

Other means might be employed for automatically controlling the flow of air through the tank and thus maintaining the temperature within the tank uniform.

Having fully described my invention, what I claim as new and desire to secure by Letters-Patent, is:—

1. In water purifying apparatus, the combination with a closed chamber having an air inlet and an air outlet, of a spray nozzle in the chamber, a steam injector, means connecting a water supply with said injector, means connecting the injector with the spray nozzle, and means for controlling the exit of air and gases through the air outlet of the chamber.

2. In water purifying apparatus, the combination with a chamber of means for heating water and atomizing it under pressure in said chamber, means for admitting air to the chamber, and means for controlling the exit of air and gases from said chamber.

3. In apparatus for purifying water, the combination with a chamber, of means for heating water and atomizing it under pressure in said chamber, means for admitting air to said chamber, means for washing the air before it enters the chamber, and means for regulating the flow of air through and the exit of air and gases from said chamber.

4. In apparatus for purifying water, the combination with a chamber, of means for heating water and atomizing water in said chamber, means for admitting air to said chamber, means for controlling the exit of air from said chamber, and means for diverting the discharge of water from said chamber when the temperature in the latter falls to a prohibitive degree.

5. In apparatus for purifying water, the combination with a chamber, means for heating water and atomizing it in said chamber, air inlet and outlet means for the chamber means operating automatically to maintain the temperature within the chamber approximately uniform, a normal discharge channel for water from said chamber, and means for diverting water from said channel when the temperature in the chamber descends to a prohibitive degree.

6. In apparatus for purifying water, the combination with a closed chamber having an air inlet and an air outlet, of a water receptacle, a cup float in said receptacle, a lever suspending said cup in the receptacle, means for discharging water into said cup, a steam injector, a pipe connecting said receptacle with the steam injector, a spray nozzle in said chamber, a pipe connecting the steam injector with said nozzle, a steam pipe communicating with said injector, a valve in said steam pipe, an arm on said valve, and a rod connecting the valve arm with the lever which carries said cup float.

7. In apparatus for purifying water, the combination with a chamber having an air inlet and an air outlet, of means for atomizing hot water in said chamber, a water discharge spout at the lower end of said chamber, a receiving channel for purified water, and a counterweighted receptacle between said discharge spout and receiving channel, said receptacle provided with a discharge passage normally communicating with the receiving channel and also communicating with the bottom of the chamber of said counterweighted receptacle through a contracted opening.

8. In water purifying apparatus, the combination with a tank, of means for atomizing heated water in said chamber, a perforated air inlet pipe entering the lower portion of said tank, an outlet tube communicating with the upper portion of said tank, and means for controlling the exit of air and gases through said outlet tube.

9. In apparatus for purifying water, the combination with a tank provided with a water discharge spout, of means for heating water, means for atomizing the heated water in said tank, air inlet means at the bottom of the tank, an outlet tube for air and gases at the top of the tank, and an automatic heat-regulating device for controlling the exit of air and gases through said outlet tube.

10. In apparatus for purifying water, the combination with a tank having a water discharge outlet, of means for heating water and atomizing it in said tank, an auxiliary tank open at its top, a perforated pipe in the lower portion of the main tank and communicating with the auxiliary tank, a water nozzle discharging into the auxiliary tank, a discharge outlet at the bottom of the auxiliary tank, an outlet tube for air and gases at the top of the main tank, and means for controlling the exit of air and gases through said outlet tube.

In testimony whereof, I have signed this specification in the presence of two subscribing witnesses.

JOHN PATTEN.

Witnesses:
HARRIET S. MAGRAW,
MARY E. UPMAN.